United States Patent [19]
Chen

[11] Patent Number: 6,055,854
[45] Date of Patent: May 2, 2000

[54] TIRE PRESSURE DETECTOR

[76] Inventor: Danny M. F. Chen, No. 15, Alley 78, Huai De Street, Pei Tou District, Taipei, Taiwan

[21] Appl. No.: 09/292,884

[22] Filed: Apr. 16, 1999

[30] Foreign Application Priority Data

Mar. 12, 1999 [TW] Taiwan ................................. 88203755

[51] Int. Cl.$^7$ ................................................. B60C 23/02
[52] U.S. Cl. ........................................ 73/146.8; 116/34 R
[58] Field of Search ................................... 73/146, 146.2, 73/146.8, 146.3; 116/34 R

[56] References Cited

U.S. PATENT DOCUMENTS

| | | | |
|---|---|---|---|
| 4,024,829 | 5/1977 | Su ........................................... | 116/34 R |
| 4,761,577 | 8/1988 | Thomas et al. ......................... | 310/67 A |
| 4,884,175 | 11/1989 | Weng ....................................... | 362/119 |
| 5,014,643 | 5/1991 | Huang ..................................... | 116/34 R |
| 5,025,244 | 6/1991 | Huang ..................................... | 340/442 |
| 5,604,481 | 2/1997 | Lin .......................................... | 340/442 |
| 5,687,672 | 11/1997 | Gabriel .................................... | 116/34 R |
| 5,856,619 | 1/1999 | Wang ....................................... | 73/146.5 |
| 5,886,254 | 3/1999 | Chi .......................................... | 73/146.8 |

*Primary Examiner*—Benjamin R. Fuller
*Assistant Examiner*—Abdullahi Aw-Musse
*Attorney, Agent, or Firm*—Dougherty & Troxell

[57] ABSTRACT

A tire pressure detector connected to the air valve of a vehicle tire to detect its inside pressure, the detector including a tubular shell fastened to the air valve of the vehicle tire, a transparent top cover fastened to the shell to hold down a socket inside the shell, a valve block moved in the socket subject to the condition of the tire pressure of the vehicle tire, and a display bolt supported on a spring member in the valve block, wherein the air pressure of the vehicle tire passes through the air valve of the vehicle tire and the air holes at the socket to push the valve block upwards in the top cover relative to the display unit upon connection of the shell to the air valve of the vehicle tire, and the air pressure of the vehicle tire is read out by viewing the area of the lower portion and upper portion of the display bolt being blocked by the valve block.

17 Claims, 6 Drawing Sheets

TIRE PRESSURE DETECTOR

BACKGROUND OF THE INVENTION

The present invention relates to a tire pressure detector for connection to the air pressure of the tire of a vehicle to indicate the condition of the air pressure of the tire.

Figure 1:
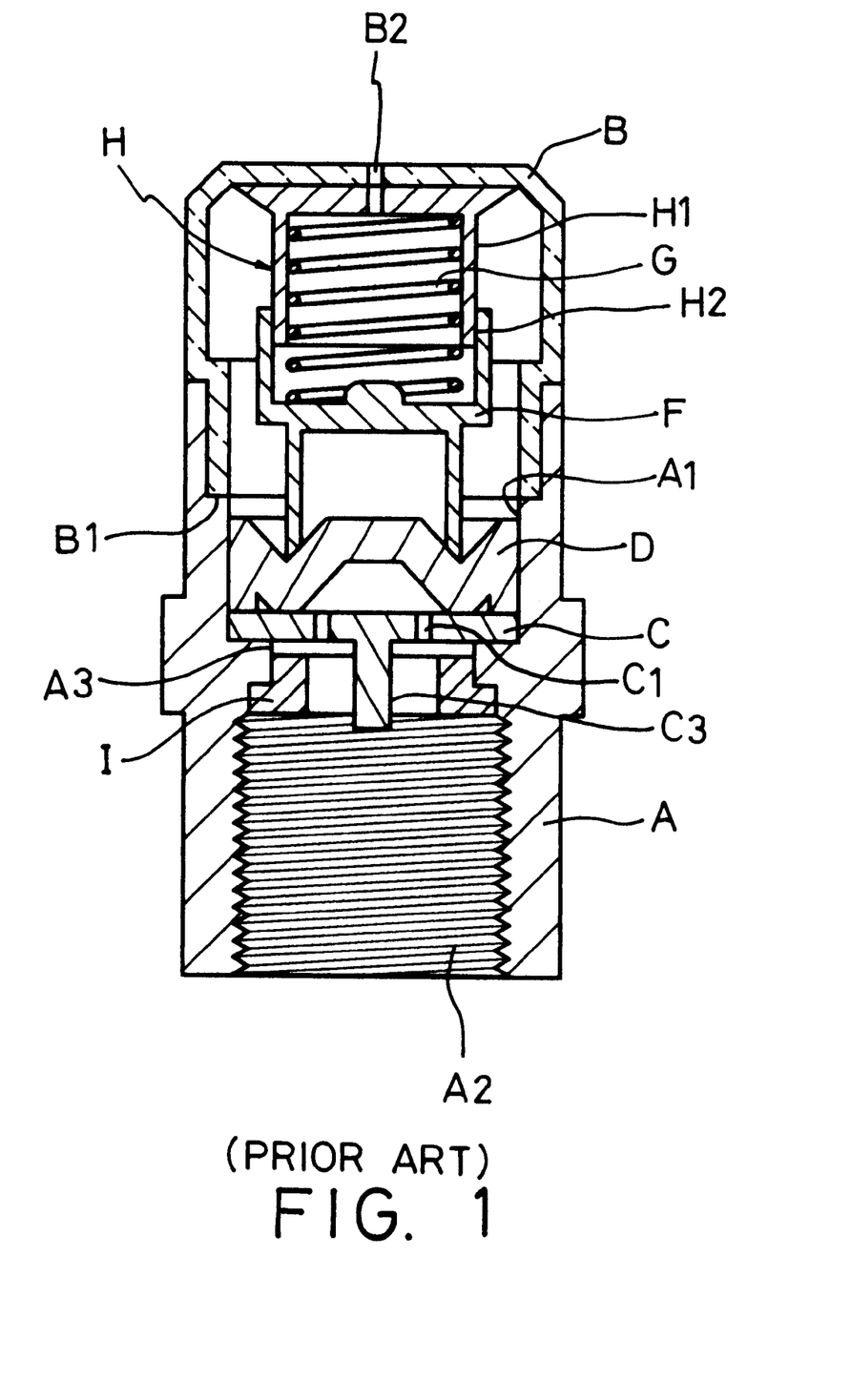
FIG. 1 is a sectional assembly view of a tire pressure detector according to the prior art.

The air pressure of the tires of a motor vehicle must be maintained within a limited range. Excessive high or low tire pressure may cause a traffic accident. In order to detect the air pressure of a vehicle tire, a manual tire pressure gage may be used. A regular manual tire pressure gage comprises a connector for connection to the air valve of a vehicle tire, and an indicator or LCD which indicates the pressure of air received from the vehicle tire. This structure of manual tire pressure gage can be used to measure the air pressure of the tire of a motor vehicle only when the motor vehicle is stopped. There is now a tire pressure indicator designed to be constantly attached to the air valve of the tire of a motor vehicle to automatically detect the condition of the air pressure of the tire. This structure of tire pressure indicator, as shown in FIG. 1, comprises a hollow cylindrical metal shell A, which has a top chamber A1, a bottom screw hole A2 for connection to the air valve of a vehicle tire, and an inside annular flange A3 between the top chamber A and the bottom screw hole A, a transparent top cover B covered on the metal shell A to close the top open chamber A1, the transparent top cover B having a tubular bottom coupling flange B1 fastened to the top chamber A1 of the metal shell A and an air hole B2 at the center of its top side wall, a flat plate C mounted inside the metal shell A and supported on the inside annular flange A3, the flat plate C having a plurality of air holes C1 and a bottom pin C3 for opening the air valve of the vehicle tire, a rubber flap D covered on the flat plate C and moved to close/open the air holes C1, a movable spring holder F supported on the rubber flap D, and a compression spring G mounted in the spring holder F, a display bolt H supported on the compression spring G, the display bolt H having an upper part HI and a lower part H2 respectively colored with different colors, and a rubber seal ring I mounted in the inside annular flange A3. When air is guided from the vehicle tire into the tire pressure detector, the spring holder F is moved relative to the display bolt H, and the condition of the tire pressure is visually checked. This structure of tire pressure detector is still not satisfactory in function. Because the rubber flap D wears quickly with use, tire pressure may escape out of the tire pressure detector through the gap between the rubber flap D and the flat plate C via the air hole B2 at the top cover B. The connection between the top cover B and the metal shell A cannot eliminate a friction between the top cover B and the metal shell A, and heat will be produced upon rubbing of the top cover B against the metal shell A, causing the tire pressure of the vehicle tire to be increased relatively. When the tire pressure of the vehicle tire surpasses a certain level, the top cover B will be forced away from the metal shell A. Therefore, this structure of tire pressure detector is not suitable for use in heavy-duty motor vehicles.

SUMMARY OF THE INVENTION

According to one embodiment of the present invention, the tire pressure detector comprises: a tubular shell, the tubular shell comprising an internally threaded female coupling portion disposed at a bottom side thereof and connected to the air valve of the vehicle tire, an externally threaded male coupling portion at a top side thereof, and an inside annular flange disposed between the internally threaded female coupling portion and the externally threaded male coupling portion; a socket mounted within the shell and supported on the inside annular flange inside the shell, the socket comprising a bottom pin inserted through the inside annular flange inside the shell into the air valve of the vehicle tire to open the air passage through the air valve of the vehicle tire, at least one air hole through a bottom side wall thereof, and a top open chamber, which receives air from the vehicle tire through the at least one air hole at the bottom side wall of the socket; a valve block mounted in the top open chamber inside the socket, the valve block comprising an upper portion, a lower portion, a plurality of annular grooves around the lower part of the periphery of the lower portion at different elevations, a valve chamber axially extended to a top side thereof, and a plurality of O-rings mounted in the annular grooves around the lower part of the periphery of the lower portion and retained in close contact with the peripheral wall of the top open chamber of the socket; a display unit mounted in the valve block, the display unit comprising a spring member mounted in the valve chamber in the valve block, and a display bolt inserted into the valve chamber in the valve block and supported on the spring member, the display bolt comprising a flat circular head, a hollow shank extended from the flat circular head, and an axial through hole through the flat circular head and the hollow shank at the center, the hollow shank having an upper portion and a lower portion; and a transparent top cover covered on the shell over the valve block and the display unit, the top cover comprising a stepped inside hole, an inner thread provided in the stepped inside hole and threaded onto the externally threaded male coupling portion of the shell, and an air hole at the center of a top side thereof in communication with the stepped inside hole; wherein the air pressure of the vehicle tire passes through the air valve of the vehicle tire and the air holes at the socket to push the valve block upwards in the top cover relative to the display unit upon connection of the shell to the air valve of the vehicle tire, and the air pressure of the vehicle tire is read out by viewing the area of the lower portion and upper portion of the display bolt being blocked by the valve block. In an alternate form of the present invention, the display unit comprises a battery holder holding a set of battery cells, and a display panel having indicator lights in it. The indicator lights are turned on/off subject the elevation of the valve block in the socket, indicating the status of the tire pressure of the vehicle tire.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 2:
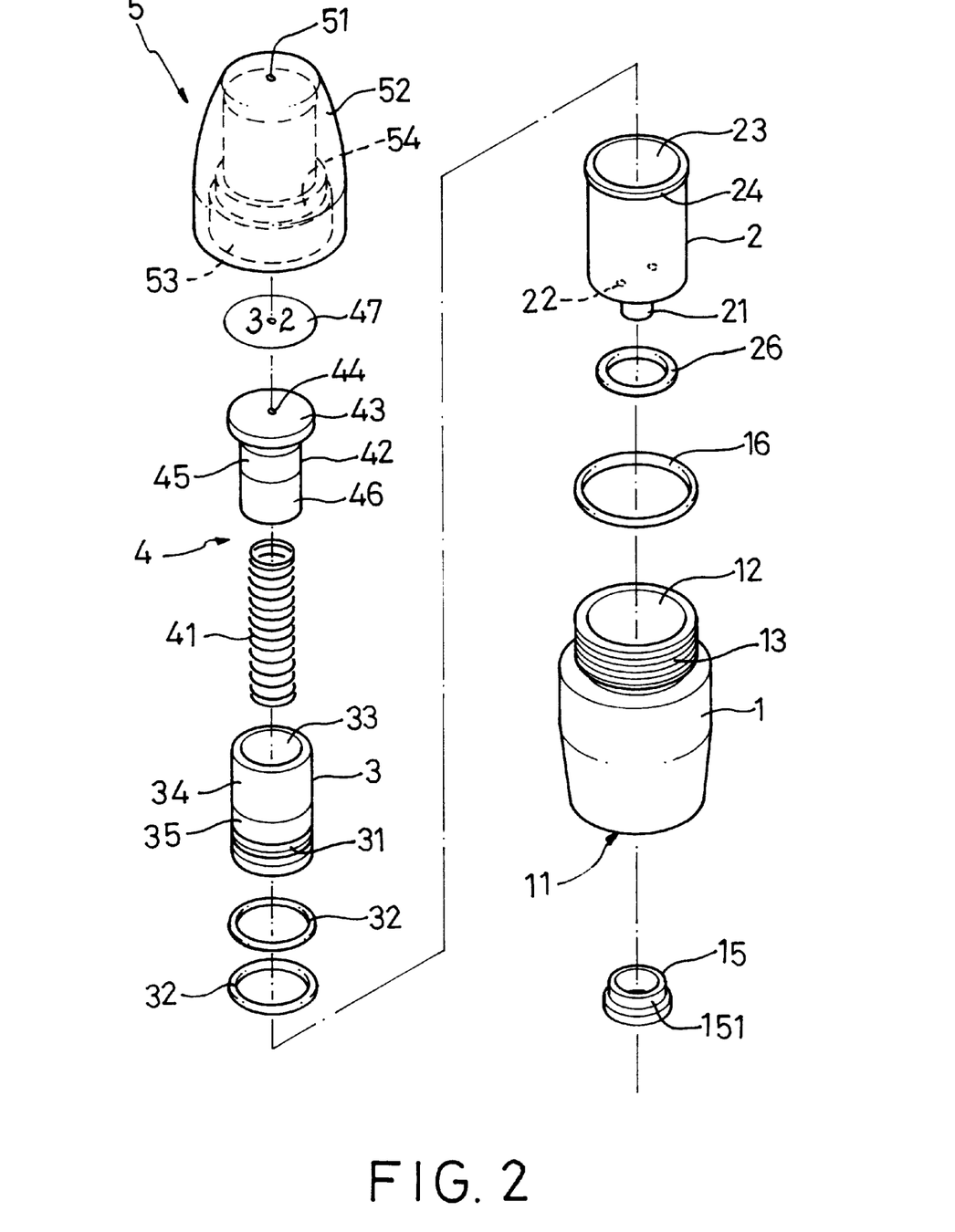
FIG. 2 is an exploded view of a tire pressure detector according to a first embodiment of the present invention.
Figure 3:
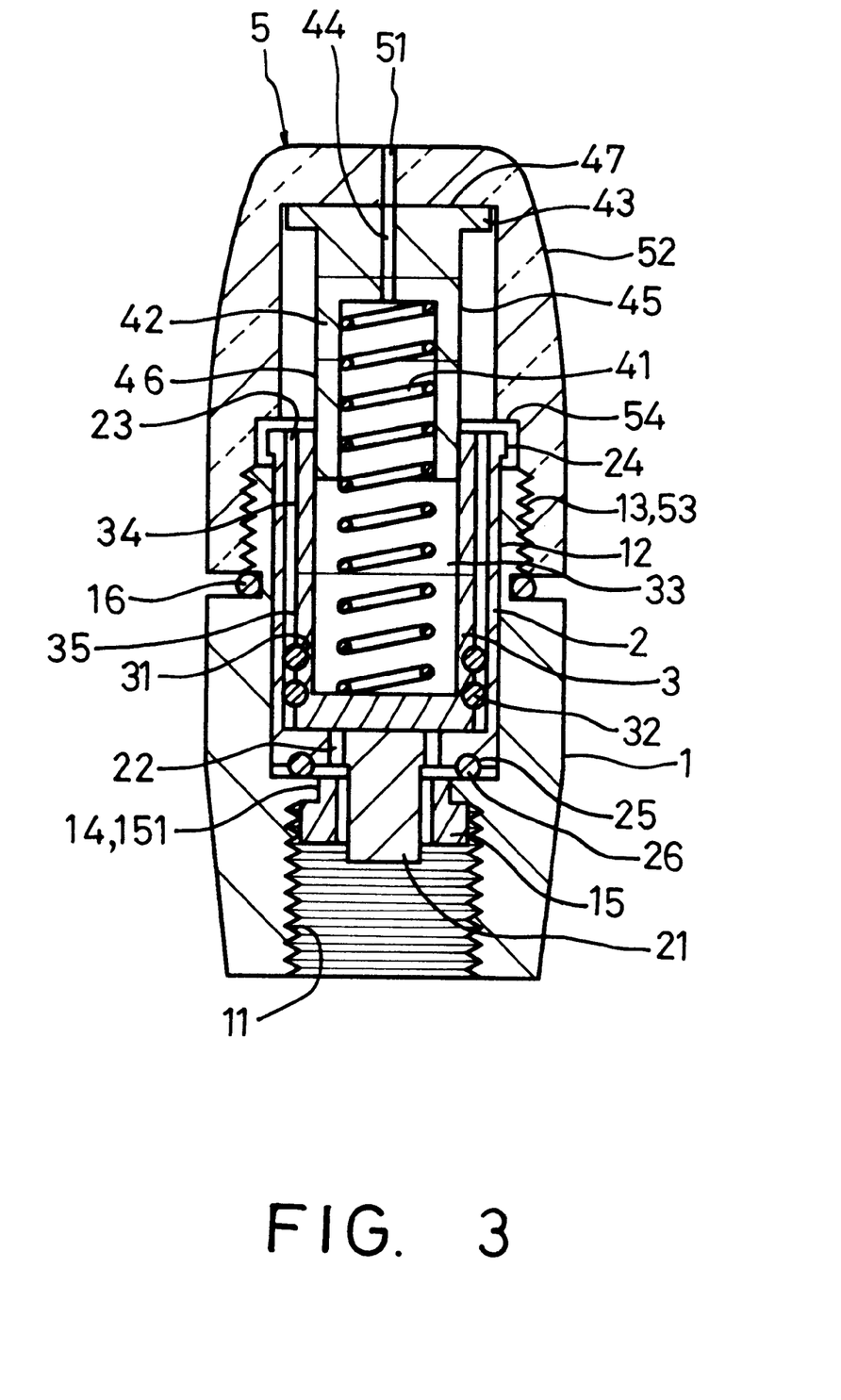
FIG. 3 is a sectional assembly view of the tire pressure detector of the first embodiment of the present invention.
Figure 4:
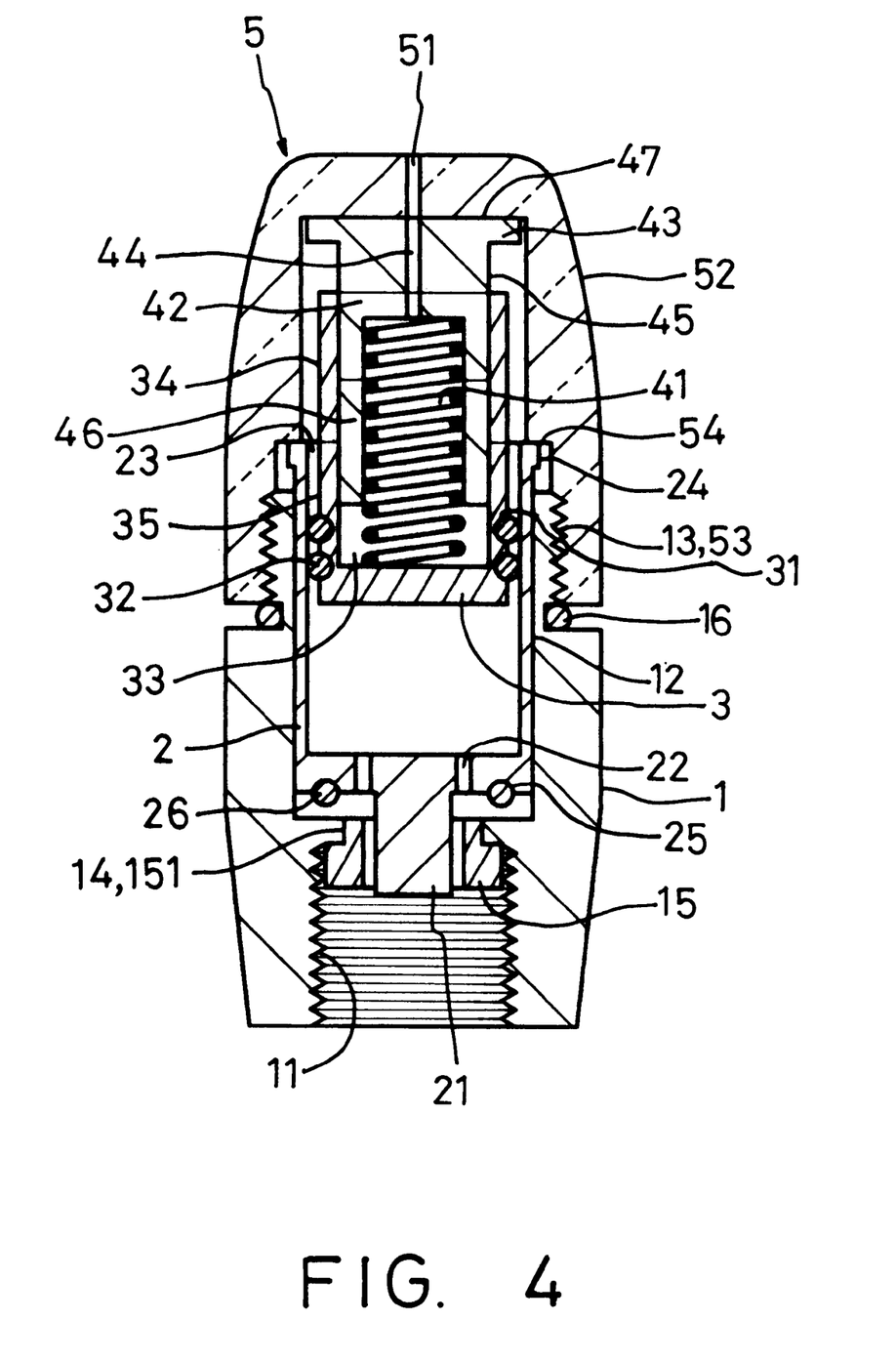
FIG. 4 is similar to FIG. 3 but showing the valve block lifted, the compression spring compressed.

Referring to FIGS from 2 through 4, a tire pressure detector in accordance with one embodiment of the present invention is shown comprised of a shell 1, a socket 2, a valve block 3, a display unit 4, and a top cover 5.

The shell 1 is a tubular member made of metal, comprising an internally threaded female coupling portion 11 at its bottom end for connection to the air valve of a vehicle tire, an externally threaded male coupling portion 13 at its top end, an axially extended receiving chamber 12 defined within the externally threaded male coupling portion 13, and an inside annular flange 14 disposed between the axially extended receiving chamber 12 and the inside space of the threaded female coupling portion 11. In order to seal the gap between the shell 1 and the air valve at the vehicle tire, a seal ring 15 is mounted inside the externally threaded male coupling portion 13, having an annular top flange 15 inserted into the inside annular flange 14. In order to seal the gap between the shell 1 and the top cover 5, an 0-ring 16 is mounted on the externally threaded male coupling portion 13.

The socket 2 is mounted within the axially extended receiving chamber 12 of the shell 1 and supported on the inside annular flange 14, comprising a bottom pin 21 axially downwardly extended from its bottom side wall at the center and inserted through the seal ring 15 and suspended in the internally threaded female coupling portion 11 for opening the air valve of the vehicle tire upon connection of the threaded female coupling portion 11 of the shell 1 to the air valve of the vehicle tire, at least one for example two air holes 22 at its bottom side wall, a top open chamber 23, an annular groove 25 formed at its bottom side wall and surrounding the air holes 22, and a top rim 24 raised around the top open chamber 23 and supported on the externally threaded male coupling portion 13 of the shell 1. An O-ring 26 is mounted in the annular groove 25 and retained between the inside annular flange 14 of the shell 1 and the bottom side wall of the socket 2.

The valve block 3 is a hollow cylindrical member mounted in the top open chamber 23 inside the socket 2, comprising an upper portion 34, a lower portion 35, a plurality of annular grooves 31 around the lower part of the periphery of the lower portion 35 at different elevations, and a valve chamber 33 axially extended to the top side thereof. Further, a plurality of O-rings 32 are respectively mounted in the annular grooves 31 around the lower part of the periphery of the lower portion 35 of the valve block 3, and retained in close contact with the inside wall of the socket 2. The upper portion 34 and the lower portion 35 of the valve block 3 are colored with different colors, for example, the upper portion 34 is colored with green color for normal indication, and the lower portion 35 is colored with red color for overload indication. Lubricating grease may be applied to the contact area between the socket 2 and the valve block 3, enabling the valve block 3 to be smoothly moved up and down in the socket 2.

The display unit 4 is comprised of a compression spring 41 mounted in the valve chamber 33, and a display bolt 42 inserted into the valve chamber 33 and supported on the compression spring 41. The display bolt 42 comprises a flat circular head 43, a hollow shank 45;46 extended from the flat circular head 43, and an axial through hole 44 through the flat circular head 43 and the hollow shank 45;46 at the center. The hollow shank 45;46 of the display bolt 42 has an upper portion 45 and a lower portion 46 respectively colored with different colors for indicating different "pressure low" conditions. For example, the upper portion 45 is colored yellow color, and the lower portion 46 is colored with orange color. Further a mark 47 is provided at the flat circular head 43 of the display bolt 42 to indicate the application range of the tire pressure detector.

The top cover 5 is a transparent member shaped like a cup, comprising a stepped inside hole 52, an inner thread 53 in the stepped inside hole 52, a step 54 in the stepped inside hole 52 above the inner thread 53, and an air hole 51 at the center of the top side thereof in communication with the stepped inside hole 52. The inner thread 53 of the top cover 5 is threaded onto the externally threaded male coupling portion 13 of the shell 1, enabling the step 54 to be stopped above the top rim 24 of the socket 2. When the valve block 3 is lifted, inside air is exhausted from the valve block 3 through the axial through hole 44 at the display bolt 42 and the air hole 51 at the top cover 5 to the outside. On the contrary, when the valve block 3 is lowered, outside air passes through the air hole 51 at the top cover 5 and the axial through hole 44 at the display bolt 42 to the inside of the valve block 3.

Referring to FIG. 2 again, when connected to the air valve of a vehicle tire, the air valve is opened by the bottom pin 21 of the socket 2, enabling tire air to pass through the air holes 22 at the socket 2 into the top open chamber 23 and to push the valve block 3 upwards. If only a part of the lower portion 46 is blocked by the valve block 3 in this stage (i.e., the upper portion 45 and the lower portion 46 of the display bolt 42 can still be seen from the outside), it means the tire pressure is severely low, and the tire must be immediately inflated. If the lower portion 46 is blocked by the valve block 3 and the upper portion 45 is maintained visible from the outside, it means the tire pressure is slightly insufficient, and the tire must be inflated within a short period of time. If the upper portion 45 and the lower portion 46 of the display bolt 42 are all blocked by the upper portion 34 of the valve block 3, it means the tire pressure is normal. Further, if the upper portion 34 and lower portion 35 of the valve block 3 simultaneously block the upper portion 45 and the lower portion 46 of the display bolt 42, it means the tire pressure is excessively high, and a certain amount of air must be released from the tire to prevent a tire explosion.

Because the top cover 5 is threaded onto the externally threaded male coupling portion 13 of the shell 1, high tire pressure does not cause the top cover 5 to be disconnected from the shell 1. Because an air tight condition is maintained between the socket 2 and the valve block 3, tire pressure is prohibited from escaping out of the tire pressure detector through the gap between the socket 2 and the valve block 3 during detection. The indication of the display unit 4 and the valve block 3 enables the user to visually check the status of the pressure of the tire. Further, by means of changing the wire diameter of the compression spring 41, or the number of O-rings 32 at the valve block 3 to adjust the friction resistance between the valve block 3 and the socket 2, the application range of the tire pressure detector is relatively changed.

Figure 5:
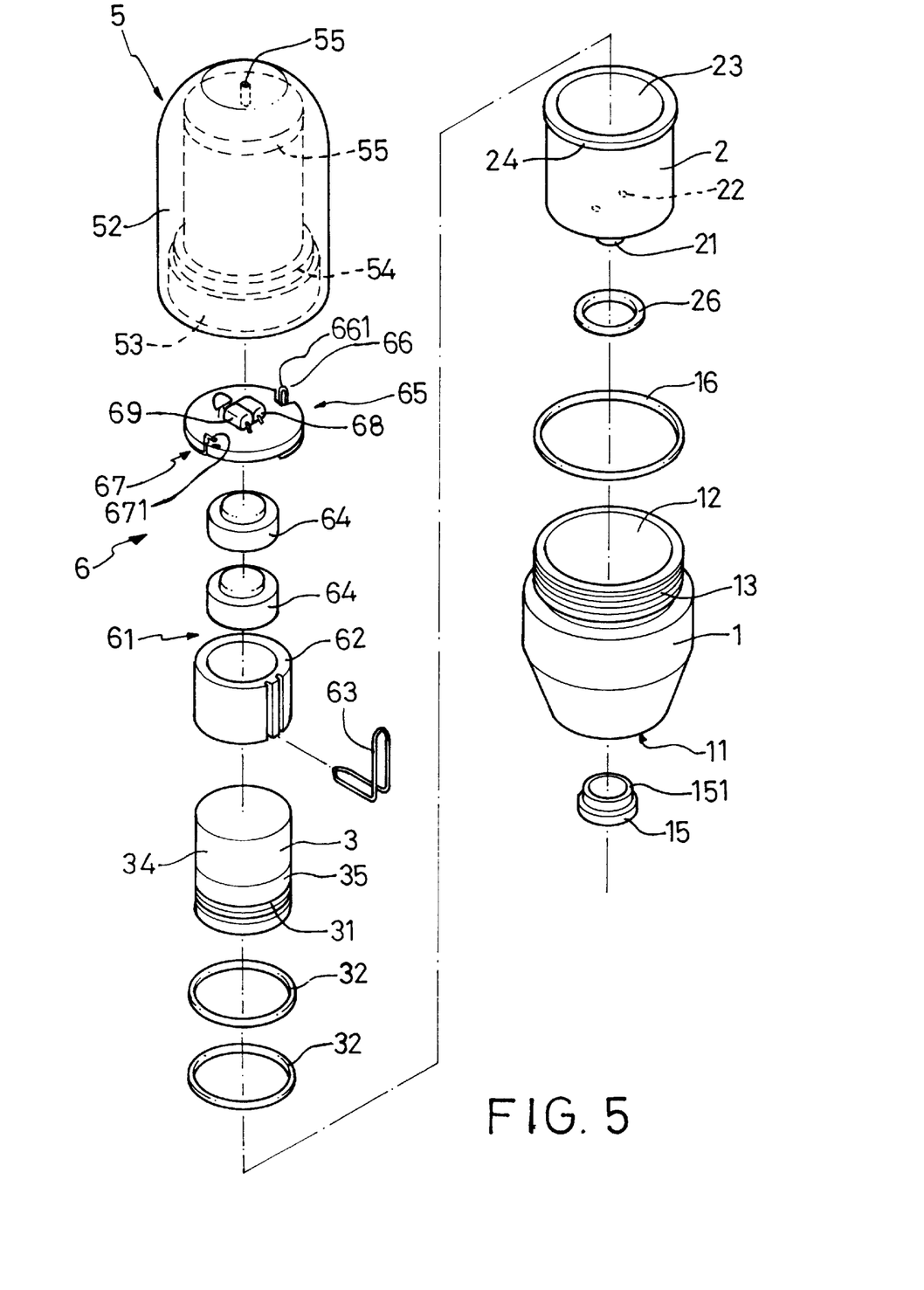
FIG. 5 is an exploded view of a tire pressure detector according to a second embodiment of the present invention.
Figure 6:
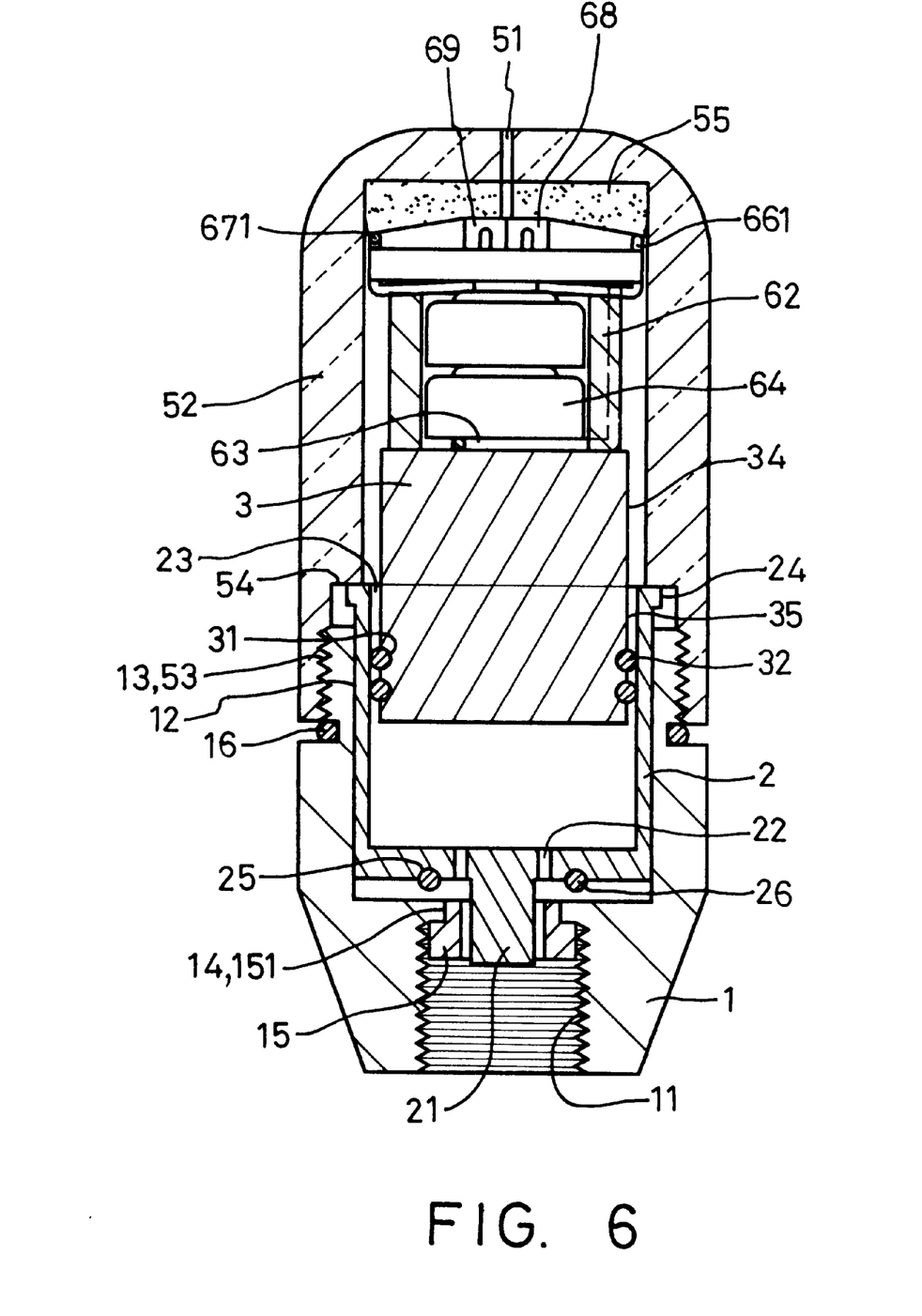
FIG. 6 is a sectional assembly view of the tire pressure detector according to the second embodiment of the present invention.

FIGS. 5 and 6 show an alternate form of the present invention. According to this alternate form, the shell 1, the socket 2, the valve block 3 and the top cover 5 remain unchanged. The display unit 6 according to this alternate form is comprised of a battery holder 61, and a display panel 65. The battery holder 61 is comprised of a holder body 62, which holds a set of battery cells 64, and a substantially L-shaped conductor bar 63 fastened to the holder body 62 on the outside and disposed in contact with the negative terminal of the set of battery cells 64. The display panel 65 is a circuit board comprising a first terminal 66 and a second terminal 67 disposed at two opposite sides, a first indicator light 68 and a second indicator light 69 respectively connected to the first terminal 66 and the second terminal 67. Further, a transparent cushion 55 is mounted inside the top cover 5.

Referring to FIG. 6 again, when the valve block 3 is lifted by the air pressure of the tire to such an elevation where the positive terminal of the set of battery cells 64 is forced into contact with a contact (not shown) at the bottom side of the display panel 65 and the conductor bar 63 is forced into contact with the first terminal 66, the first indicator light 68 is turned on, indicating an insufficient tire pressure status. If the valve block 3 is continuously lifted to such an elevation where the tip 661 of the first terminal 66 is pressed against the cushion 55, the first terminal 66 is forced to disconnect the circuit and to turn off the first indicator light 68. When the first indicator light 68 is off, it means the tire pressure is normal (see FIG. 6). If the valve block 3 is continuously lifted to such an elevation where the tip 671 of the second terminal 67 is pressed against the cushion 55, the second terminal 67 is forced to connect the circuit and to turn on the second indicator light 69. When the second indicator light 69 is on, it means the tire pressure is excessively high.

According to the second embodiment shown in FIGS. 5 and 6, the first indicator light 68 is a yellow LED (light emitting diode), and the second indicator light 69 is a red LED. When the tire pressure is normal, the first indicator light 68 and the second indicator light 69 are off, and no battery power is consumed. When the tire pressure is low, the first indicator light 68 is on, and the second indicator light 69 is off. When the tire pressure is excessively high, the first indicator light 68 is off, and the second indicator light 69 is on.

It is to be understood that the drawings are designed for purposes of illustration only, and are not intended for use as a definition of the limits and scope of the invention disclosed.

What the invention claimed is:

1. A tire pressure detector connected to an air valve of a vehicle tire to detect the air pressure of the vehicle tire, comprising:

a tubular shell comprising an internally threaded female coupling portion disposed at a bottom side thereof and connected to the air valve of the vehicle tire, an externally threaded male coupling portion at a top side thereof, and an inside annular flange disposed between said internally threaded female coupling portion and said externally threaded male coupling portion;

a socket mounted within said tubular shell, said socket comprising a bottom pin inserted through the inside annular flange inside said tubular shell into the air valve of the vehicle tire to open an air passage through the air valve of the vehicle tire, at least one air hole through a bottom side wall thereof, and a top open chamber, which receives air from the vehicle tire through the at least one air hole at the bottom side wall of said socket;

a transparent cop cover mounted on said tubular shell, said top cover comprising a stepped inside hole, an inner thread provided in said stepped inside hole and threaded onto the externally threaded male coupling portion of said tubular shell, and an air hole through a center of a top side thereof in communication with said stepped inside hole;

a valve block movably mounted in the top open chamber inside said socket, the valve block having an upper portion, a lower portion and sealing elements located on the lower portion in contact with the socket, the valve block movable such that at least a portion extends outwardly from the socket and into the transparent top cover so as to be visible through the transparent top cover; and a display unit comprising a display bolt and a spring acting between the display bolt and the valve block urging the display bolt into contact with the top side of the transparent top cover, the display bolt having a hollow shank, the hollow shank having indicia thereon visible through the transparent cover indicative of tire pressure and extending into the valve block such that outward movement of the valve block relative to the socket covers at least a portion of the indicia on the hollow shank;

wherein the air pressure of the vehicle tire passes through the air valve of the vehicle tire and said at least one air hole in said socket to move the valve block against the spring relative to the hollow shank of said display bolt upon connection of said shell to the air valve of the vehicle tire, the exposed indicia on the hollow shank visible through the transparent top cover indicating the air pressure of the vehicle tire.

2. The tire pressure detector of claim 1 further comprising a seal ring mounted inside the externally threaded male coupling portion of said tubular shell to seal a gap between said shell and the air valve at the vehicle tire, said seal ring having an annular top flange inserted into the inside annular flange of said shell.

3. The tire pressure detector of claim 1 further comprising an O-ring mounted on the externally threaded male coupling portion of said shell to seal a gap between said shell and said transparent top cover.

4. The tire pressure detector of claim 1 wherein said socket further comprises an annular groove in the bottom side wall thereof and having an O-ring mounted in the annular groove so as to be located between the inside annular flange of said shell and the bottom side wall of said socket.

5. The tire pressure detector of claim 1 further comprising a lubricating grease applied to a contact area between said socket and said valve block.

6. The tire pressure detector of claim 1 wherein the hollow shank comprises an upper portion and a lower portion and wherein the indicia comprises different colors on the upper portion and the lower portion of said hollow shank.

7. The tire pressure detector of claim 6 wherein the upper portion of said valve block has a green color, the lower portion of said valve block has a red color, the upper portion of said hollow shank of said display bolt has a yellow color, and the lower portion of said hollow shank of said display bolt has an orange color.

8. The tire pressure detector of claim 1 wherein said display unit further comprises a second indicia on said display bolt visible through said transparent top cover to indicate the application range of the tire pressure detector.

9. The tire pressure detector of claim 1 wherein said transparent top cover further comprises an inside step above the inner thread thereof, and said socket further comprises a top rim retained between the externally threaded male coupling portion of said tubular shell and the inside step.

10. A tire pressure detector connected an air valve of a vehicle tire to detect the air pressure of the vehicle tire, comprising:

a tubular shell comprising an internally threaded female coupling portion disposed at a bottom side thereof and connected to the air valve of the vehicle tire, an externally threaded male coupling portion at a top side thereof, and an inside annular flange disposed between said internally threaded female coupling portion and said externally threaded male coupling portion;

a socket mounted within said shell, said socket comprising a bottom pin inserted through the inside annular flange inside said tubular shell into the air valve of the vehicle tire to open the air passage through the air valve of the vehicle tire, at least one air hole through a bottom side wall thereof, and a top open chamber, which receives air from the vehicle tire through the at least one air hole at the bottom side wall of said socket;

a valve block movably located in the top open chamber inside said socket, said valve block comprising an upper portion, a lower portion located within the top open chamber and sealing elements on the lower portion in contact with a wall of the top open chamber of said socket;

a display unit comprising a battery holder located on said valve block and having a set of battery cells including at least positive and negative terminals, a display panel located above said battery holder, a substantially L-shaped conductor bar disposed on an outside of said battery holder and connected to said negative terminal of said set of battery cells, said display panel comprising first and second terminals disposed at two opposite sides of said display panel, first and second indicator lights respectively connected to said first terminal and said second terminal, wherein said L-shaped conductor bar, said first terminal and said second terminal have different heights above said valve block; and a transparent top cover mounted on said shell over said valve block and said display unit such that said first and second indicator lights are visible through said top cover comprising a stepped inside hole, a transparent cushion mounted inside said stepped inside hole at a top side thereof, an inner thread provided in said stepped inside hole and threaded onto the externally threaded male coupling portion of said shell, and an air hole at the center of a top side thereof in communication with said stepped inside hole;

whereby air pressure of the vehicle tire passing through the air valve of the vehicle tire and said at least one air hole at said socket moves the valve block and battery holder upwards in said top cover relative to said display unit such that, upon contact of said positive terminal of the set of battery cells with the display unit and contact between the L-shaped conductor bar and the first terminal, the first indicator light is turned on, indicating a low tire pressure; further outward movement of the valve block brings the first terminal in contact against the transparent cushion thereby turning off the first indicator light indicating normal tire pressure; and further outward movement of the valve block moves the display unit toward the transparent cushion to bring the second terminal in contact with the transparent cushion thereby turning on the second indicator light to indicate excessively high tire pressure.

11. The tire pressure detector of claim 10 further comprising a seal ring mounted inside the externally threaded male coupling portion of said tubular shell to seal a gap between said shell and the air valve at the vehicle tire, said seal ring having an annular top flange inserted into the inside annular flange of said shell.

12. The tire pressure detector of claim 10 further comprising an O-ring mounted on the externally threaded male coupling portion of said shell to seal a gap between said shell and said transparent top cover.

13. The tire pressure detector of claim 10 wherein said socket further comprises an annular groove in the bottom side wall thereof and having an O-ring mounted in the annular groove so as to be located between the inside annular flange of said shell and the bottom side wall of said socket.

14. The tire pressure detector of claim 10 further comprising a lubricating grease applied to contact area between said socket and said valve block.

15. The tire pressure detector of claim 10 wherein said first indicator light and said second indicator light have different colors.

16. The tire pressure detector of claim 15 wherein said first indicator light comprises a yellow color light emitting diode, and said second indicator light comprises a red color light emitting diode.

17. The tire pressure detector of claim 10 wherein said transparent top cover comprises an inside step above the inner thread thereof, and said socket further comprises a top rim retained between the externally threaded male coupling portion of said tubular shell and the inside step.

* * * * *